US009335832B2

(12) United States Patent
Klein

(10) Patent No.: US 9,335,832 B2
(45) Date of Patent: May 10, 2016

(54) EXECUTING SYSTEM ACTIONS CORRESPONDING TO USER INPUTS

(75) Inventor: Udo Klein, Maximiliansau (DE)

(73) Assignee: SAP SE, Walldorf (DE)

( * ) Notice: Subject to any disclaimer, the term of this patent is extended or adjusted under 35 U.S.C. 154(b) by 1009 days.

(21) Appl. No.: 13/335,942

(22) Filed: Dec. 23, 2011

(65) Prior Publication Data

US 2013/0167036 A1 Jun. 27, 2013

(51) Int. Cl.
*G06F 3/0481* (2013.01)
*G06F 3/023* (2006.01)
*G06Q 30/02* (2012.01)

(52) U.S. Cl.
CPC .............. *G06F 3/0237* (2013.01); *G06Q 30/02* (2013.01)

(58) Field of Classification Search
CPC .................................... G06F 3/0237
USPC ........................................... 715/738
See application file for complete search history.

(56) References Cited

U.S. PATENT DOCUMENTS

| | | | | |
|---|---|---|---|---|
| 6,055,569 A * | 4/2000 | O'Brien | ............ | G06F 17/30902 707/E17.12 |
| 6,584,498 B2 * | 6/2003 | Nguyen | ............ | G06F 17/30902 707/E17.12 |
| 7,130,890 B1 * | 10/2006 | Kumar | ................ | H04L 67/2847 707/999.01 |
| 7,219,101 B2 * | 5/2007 | Dorsey | .................. | G06F 9/4448 |
| 7,523,231 B1 * | 4/2009 | Gupta | .................. | G06F 3/0605 707/999.009 |
| 7,558,822 B2 * | 7/2009 | Fredricksen | ...... | G06F 17/30902 709/203 |
| 7,634,567 B1 * | 12/2009 | Wood | ................... | G06Q 10/107 707/999.009 |
| 7,693,816 B2 * | 4/2010 | Nemoto | ............ | G06F 17/30457 707/781 |
| 7,747,749 B1 * | 6/2010 | Erikson | ............. | G06F 17/30902 709/219 |
| 7,827,496 B2 * | 11/2010 | Dorn | ..................... | G06F 9/4443 715/234 |
| 8,341,245 B1 * | 12/2012 | Roskind | ........... | G06F 17/30902 709/219 |
| 8,566,696 B1 * | 10/2013 | Hamon | ............ | G06F 17/30899 715/205 |
| 8,595,443 B2 * | 11/2013 | Arimilli | .............. | G06F 12/0862 711/137 |
| 8,600,921 B2 * | 12/2013 | Burkard | ............. | G06F 17/0862 706/45 |
| 8,650,139 B2 * | 2/2014 | Jain | ................... | G06F 17/30905 706/12 |
| 8,655,819 B1 * | 2/2014 | Burkard | ............... | G06N 99/005 706/45 |
| 8,732,355 B1 * | 5/2014 | Chan | ................. | G06F 17/30132 710/36 |
| 8,732,569 B2 * | 5/2014 | Burkard | ........... | G06F 17/30902 715/205 |
| 8,744,988 B1 * | 6/2014 | Hamon | ................ | G06N 99/005 706/45 |
| 8,762,490 B1 * | 6/2014 | Roskind | ........... | G06F 17/30902 709/217 |
| 2003/0225937 A1 * | 12/2003 | Reiss | .................. | G06F 17/3056 719/332 |

(Continued)

*Primary Examiner* — Reza Nabi

(57) ABSTRACT

In an embodiment, the user input and a corresponding user input pattern is received on a computer generated user interface (UI). Based upon the user input pattern, a probable succeeding user input is predicted, and a network repository is queried to determine a system action corresponding to the probable succeeding user input. The system action may be an action that is estimated to be processed based upon the user input. This system action is processed to determine associated metadata, which is persisted in a UI buffer associated with the UI. A correlation between the succeeding user input and the predicted probable succeeding user input is determined; and based upon the correlation the metadata is retrieved from the UI buffer for execution.

20 Claims, 5 Drawing Sheets

(56) References Cited

U.S. PATENT DOCUMENTS

| | | | | |
|---|---|---|---|---|
| 2006/0047804 A1* | 3/2006 | Fredricksen | G06F 17/30902 | 709/224 |
| 2006/0143568 A1* | 6/2006 | Milener | G06F 17/30899 | 715/738 |
| 2006/0259506 A1* | 11/2006 | Kim | G06F 9/4443 | |
| 2006/0294500 A1* | 12/2006 | Chiang | G06F 8/30 | 717/109 |
| 2007/0250377 A1* | 10/2007 | Hill | G06Q 10/00 | 705/7.13 |
| 2008/0263462 A1* | 10/2008 | Mayer-Ullmann | G06F 9/4443 | 715/762 |
| 2009/0287617 A1* | 11/2009 | Schmidt | G06Q 10/06 | 706/10 |
| 2010/0088398 A1* | 4/2010 | Plamondon | H04L 67/2852 | 709/220 |
| 2010/0169844 A1* | 7/2010 | Hoff | G06Q 10/06 | 715/866 |
| 2010/0293339 A1* | 11/2010 | Arimilli | G06F 12/0862 | 711/137 |
| 2010/0312858 A1* | 12/2010 | Mickens | G06F 17/30902 | 709/219 |
| 2012/0084340 A1* | 4/2012 | McCormack | G06Q 30/01 | 709/203 |
| 2012/0144338 A1* | 6/2012 | Hymel | G06F 3/04842 | 715/773 |
| 2013/0086490 A1* | 4/2013 | Roskind | G06F 17/30902 | 715/760 |
| 2014/0032485 A1* | 1/2014 | Perelman | G06F 17/243 | 707/608 |
| 2014/0095152 A1* | 4/2014 | Kim | G10L 15/1815 | 704/9 |

* cited by examiner

| IT - Declaration Type: | Housing (HRA / CLA / COA) ▼ |

Remarks / Comments
File Attachments  — 305

| Accommodation Type: | Rented Accom. ▼ |
| City Category: | Non Metro ▼ |
| From Date: | 11/12/2010 |
| To Date: | 12/31/9999 |
| Proposed Rent Amount: | 22000 |
| Actual Rent Amount: | 25000 | 305A |
| Landlord's Address: | 345, Block G, Sector 6, Lake Town |

Consider Actuals: ☐

Dependents

| Relationship | Name | Gender | Date of Birth | Nationality |
|---|---|---|---|---|
| Self | Patil Samrat | Male ▼ | 12/15/1970 | Indian |
| Spouse | Ragini Patil | Female ▼ | 01/01/1974 | Indian |
| Father | Ravi Patil | Male ▼ | 01/01/1934 | Indian |
| Mother | Vasanti Patil | Female ▼ | 01/01/1944 | Indian |
| Child | Rohini Patil | Female ▼ | 05/01/2006 | Indian |

Row 1 of 5

— 310A

☐ I acknowledge and accept: Terms and Conditions

— 310B  — 310C  — 310D  — 310E

[◀ Previous] [Review] [Submit] [Cancel]

FIG. 3

EXECUTING SYSTEM ACTIONS CORRESPONDING TO USER INPUTS

FIELD

The field generally relates to computer systems and software, and more particularly to various methods and systems to execute a system action corresponding to a user input.

BACKGROUND

In enterprise related applications, one factor influencing a computer system's response time to transactions is the productivity of the applications running on the system. Besides this, the response time may depend on various factors associated with the computer system, including a frequency at which a processor of the system functions, a bandwidth of a data transfer medium, a memory of the system, computing intelligence of the processor, and the like. In spite of designing a computer system with ideal hardware conditions, the response time may be affected by network latency. Network latency may be described as time taken to transmit and receive data between a source and a destination in a network. In addition, for server based computer systems, the network latency may increase, since the server provides services to various clients over the network. Hence, server based systems have a higher latency compared to self contained systems.

SUMMARY

Various embodiments of systems and methods to execute a system action corresponding to a user input are disclosed. In an embodiment, a system action is a functional attribute of a system (for e.g. computer system) that is triggered based upon an input to the system. The input to the system may be in a form of a user input provided on a user interface, a system generated input provided as a resultant of another process, a determined value assigned to the action, and the like. Based upon the input provided to the system, the system executes the system action to compute an execution resultant. In an embodiment, for a user input provided on a computer generated user interface, the system executes a corresponding system action.

In an embodiment, the user input and a corresponding user input pattern is received on a computer generated user interface (UI). Based upon the user input pattern, a probable succeeding user input is predicted, and a network repository is queried to determine a system action corresponding to the probable succeeding user input. The system action may be an action that is estimated to be processed based upon the user input. This system action is processed to determine associated metadata, which is persisted in a UI buffer associated with the UI. A correlation between the succeeding user input and the predicted succeeding user input is determined; and based upon the correlation the metadata is retrieved from the UI buffer for execution.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 3 is a block diagram illustrating an exemplary method to execute a system action corresponding to a user input, according to an embodiment.

DETAILED DESCRIPTION

Embodiments of techniques for systems and methods to execute a system action corresponding to a user input are disclosed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In an embodiment, a system action is estimated to be processed and executed based upon the input to render an estimated result. The system may determine a corresponding system action for a user input instantaneously or with some delay based upon the system's response time. The response time of a self contained system (e.g. a desktop system) is quicker compared to a server based system since the network latency is absent. However, a storage device associated with the self contained system may be overloaded with a large amount of data, thereby creating latency in response time. To mitigate a latency of the system's response time and avoid overload, minimal information that is accessed via a network may be loaded anticipatorily to a local storage space. This anticipatorily loaded information may be extracted from the local storage space when a corresponding action is selected on the UI, thereby eliminating the network latency.

Figure 1:
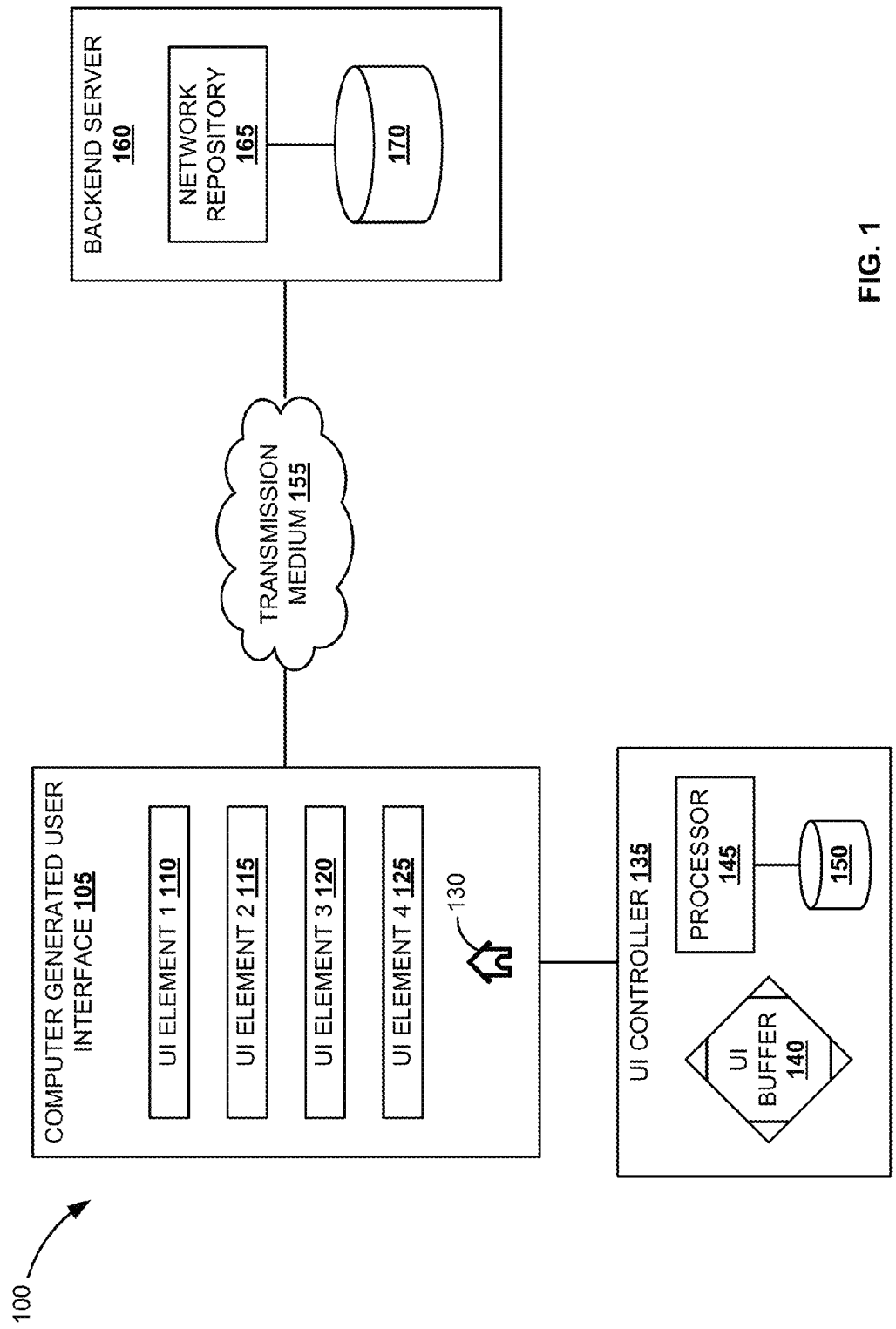
FIG. 1 is a block diagram illustrating an overall architecture of a system to execute a system action corresponding to a user input, according to an embodiment.

FIG. 1 is a block diagram illustrating an overall architecture of a system to execute a system action corresponding to a user input, according to an embodiment. System 100 includes a computer generated user interface (UI) 105, UI elements (e.g. 110, 115, 120, 125, 130), UI controller 135, associated UI buffer 140, processor 145 and memory element 150, transmission medium 155, backend server 160, associated network repository 165 and database 170. In an embodiment, computer generated UI 105 is associated with UI controller 135, and is in communication with backend server via transmission medium 155. Transmission medium 155 is a communication channel between computer generated UI 105 and/or UI controller 135 which represents a frontend, and backend server 160. In an embodiment, backend server 160 exists in a network of various devices that may be interconnected by multiple communication channels, and allow sharing of resources or information. Backend server 160 is further in communication with network repository 165 and database 170. Network repository 165 stores metadata associated with all system actions that are executable by backend server 160. A business processor associated with backend server 160 (not shown in FIG. 1) may be responsible for executing all the system actions on backend server 160. Database 170 stores business conditions, business logic and business scenarios associated with executing the system action, for instance. Network repository 165 may extract relevant information from database 170 to execute a system action or to transfer the metadata from backend server 160 to another system (e.g. UI controller 135). In an embodiment, the information stored in database 170 is migrated along with the metadata stored in network repository 165 to UI controller 135.

Computer generated user interface (UI) 105 is utilized for establishing interactions between a user and backend server 160 to execute one or more system actions corresponding to one or more user inputs. In an embodiment, UI 105 includes UI elements (e.g. 110 115, 120, 125, 130) that allow the user to interact with the computer. A user input may be received on UI 105 as one of one or more inputs to execute the system action. A user input to UI 105 may be received as, but is not limited to, a keyboard entry, a mouse click, a touch of a display screen, an audio input, a visual input, or the like. A person skilled in the related art will appreciate various other types of modes through which a user input may be received at UI 105. Based upon the received user input, UI controller 135 identifies a user input pattern associated with the user input. For instance, user inputs may include values entered at the UI elements (110, 115, 120 and 125) or a process triggered at UI element 130, or the like, that represent one or more parameters based upon which the system action is executed. For example, consider a UI illustrating a PROFIT INCURRED BY SALES (UI 105) that has received three user inputs PRODUCT (UI element 110), QUANTITY (UI element 115) and DELIVERY DATE (UI element 120) and one user input trigger CALCULATE (UI element 125). Consider that a user of the computer device provides values 'ABC', '10' and '20 Jan. 2012' as three user inputs via a keyboard. UI controller 110 identifies a pattern of the user input before the user triggers the system (computer) by activating (UI element 125) that represents CALCULATE associated with the (UI element 125). UI controller 135 predicts a probable succeeding user input and queries network repository 165 to determine associated system action corresponding to the probable expected user input. Here, UI controller determines a probable trigger of (UI element 125) to CALCULATE the profit incurred by sales, and queries network repository 165 to determine associated system actions SELLING PRICE and COST PRICE of the PRODUCT ABC and associated metadata which is a formula to calculate the PROFIT (PROFIT=SELLING PRICE-COST PRICE). UI controller stores the metadata along with the corresponding system actions in UI buffer 140. In an embodiment, storing (or persisting) the metadata of the system action in UI buffer 140 includes prefetching a system action corresponding to a predicted probable succeeding user input and preloading UI buffer 140 with the prefetched system action.

Further, when the user triggers UI controller 135 by providing a succeeding user input to (UI element 125), UI controller determines a correlation between the succeeding user input and the predicted probable user input. The correlation represents a determination of whether the provided user input is equivalent to the predicted probable succeeding user input. In an embodiment, the correlation is determined by determining a succeeding user input to a succeeding UI element on UI 105 and determining whether the succeeding user input is identical to the predicted probable succeeding user input. For an identical succeeding user input, the metadata of the system action is retrieved and the system action is executed for the succeeding user input. In the above example, UI controller 135 determines if the predicted probable succeeding user input is equivalent to the actual succeeding user input CALCULATE received at a current instance. Based upon this determination of the correlation, UI controller 135 retrieves the metadata from UI buffer 140 and executes the system action according to the user inputs (received at UI elements 110, 115, 120, 125 and 130). In an embodiment, retrieving the metadata of the corresponding system actions include instantaneously executing the system action based upon the metadata to reduce the network latency of the associated transmission medium 155.

In an embodiment, the user input patterns include a current location or position of the user input for example, a movement of a mouse pointer, a movement of a keyboard cursor, a touch on a touch screen display, or the like. For instance, if a UI 105 includes ten UI elements that accept user input, where the tenth UI element is a trigger to execute a corresponding system action associated with UI 105; UI controller 135 continually identifies the location of the keyboard cursor and when the keyboard cursor reaches the ninth UI element, the UI controller predicts a probable user input to the tenth UI element and queries network repository 165 to retrieve one or more system actions and corresponding metadata. Upon receiving the tenth user input, UI controller determines a correlation between the actual tenth user input received and the predicted probable tenth user input. Based upon a determination of equivalence between the predicted user input and the actual user input, UI controller retrieves the system actions and the corresponding metadata from a local buffer (UI buffer) and executes the system action. Thus, the time period between the ninth user input received and the tenth user input received is used to retrieve the system action that correspond to the tenth user input, and is stored locally at UI buffer. Thus the network latency occurred while retrieving relevant information subsequent to receiving the tenth user input is reduced.

In another example, UI controller 135 identifies a location and position of a mouse pointer along with a movement pattern for instance, a speed of movement of the mouse pointer on UI 105. For instance, if a user input is to be received at a bottom right corner of a current page in UI 105, and a current location of the mouse pointer is top left corner, the mouse has to be moved across the current page. The speed of movement of the mouse pointer varies as the pointer gets closer to its destination (UI element that receives user input). For example, if the current position of the mouse pointer is far from the UI element that accepts user input, a user may briskly drag the mouse pointer until the pointer reaches close to the UI element. The movement pattern of the pointer slows down here, to click the UI element that further executes a corresponding action. UI controller 135 determines the user input pattern which is the brisk movement of the mouse pointer from top left corner to bottom right corner, and predicts a probable succeeding user input, which is a mouse-click on the UI element. Based upon the pattern, UI controller 135 queries network repository 165 and determines the corresponding system actions along with the metadata and stores this information in UI buffer 140. Upon receiving the user input on the UI element, UI controller 135 determines if the user input was received on the predicted probable UI element, and retrieves the information from UI buffer 140 for execution. A person skilled in the related art will appreciate various other types of predictive methods that may be used based upon the user input and/or UI elements available at UI 105.

In an embodiment, UI controller 135 records the movement pattern of the user input by tracking the movement and the movement pattern of the mouse pointer from a first section to a second section of UI 105. Based upon a change in the movement pattern of the mouse pointer, for instance a click of the mouse, UI controller 135 is triggered to predict the probable succeeding user input. UI controller 135 may also record the movement pattern of the user input by tracking a location of the keyboard cursor.

In an embodiment, the user input pattern is a representation of structural criteria, and is determined by determining attributes of the structural criteria. A structural criterion of the user input pattern may include an occurrence of recurring events or objects associated with a business process to be executed by receiving inputs on UI 105. For instance, to calculate a profit of sales of product ABC, the same set of objects (or UI elements—PRODUCT; SELLING PRICE and COST PRICE) may be used; however, the values entered for each objects may vary. Hence, by determining the structural criteria, UI controller statistically predicts a probable succeeding user input. In an embodiment, a plurality of probable succeeding user inputs may be included. For instance, in place of UI element CALCULATE, UI 105 may include CALCULATE FOR YEAR 2010, CALCULATE FOR YEAR 2011 and CALCULATE FOR YEAR 2012. In such cases, UI controller 135 may query and retrieve information related to all three UI elements. In an embodiment, UI controller 135 may determine user input pattern for a combination of types of user inputs, for instance a mouse pointer and a keyboard cursor. For example, UI controller 135 identifies a movement of the mouse pointer, and if the pointer is moved away from one or more of the UI elements, UI controller excludes a determination of system actions and/or metadata for such UI elements. In an embodiment, a UI element may accept multiple user inputs, for example a mouse point hover and a mouse click. UI controller determines a hover of the mouse pointer on the UI element and queries network repository 165 to determine the system actions and metadata associated with the predicted probable 'mouse click' and stores the information in UI buffer 140. If the user input received is a mouse click on the UI element, UI controller 135 retrieves the system action and the metadata from UI buffer 140 and performs the execution.

In an embodiment, statistically predicting the probable succeeding user input includes determining one or more available succeeding UI elements succeeding from the previous UI element or from the UI element that has currently received the user input. Further, UI controller 135 processes the user input pattern and the available succeeding UI elements to predict the probable succeeding user input. In another embodiment, one or more navigational inputs are predicted prior to occurrence of the succeeding user inputs. Navigational inputs include hyperlinks that are reference to a data stored in backend server 160. Based upon a user input pattern associated with the navigational input, UI controller 135 predicts a probable succeeding user input prior to the occurrence, and retrieves the corresponding system actions. Predicting the probable succeeding user input for the navigational input includes determining the reference of a navigational UI element and identifying associated information including system action and the associated metadata. Upon receiving the user input on the UI element, UI controller 135 determines if the user input was received on the predicted probable UI element, and retrieves the information from UI buffer 140 for execution.

In an embodiment, UI controller 135 includes a UI control grid that represents a structural illustration (for e.g. a UI backend) of UI 105. The UI control grid includes multiple intersecting vertical and horizontal axes to create multiple structures, where each structure represents a grid element. The UI control grid facilitates in organizing UI elements on UI 105, thus being in correlation with a corresponding part of UI 105 and associated UI elements. The user input pattern at each grid element is determined to identify one or more preceding user inputs. The identified user input at each UI element may be translated into a grid element understandable correlation. Based upon the user input pattern, a probable succeeding user input is predicted. In an embodiment, each grid element is mapped to a corresponding section of UI 105, and the user input pattern at the corresponding section of UI 105 is identified and notified to the grid element by UI controller 135.

Figure 2:
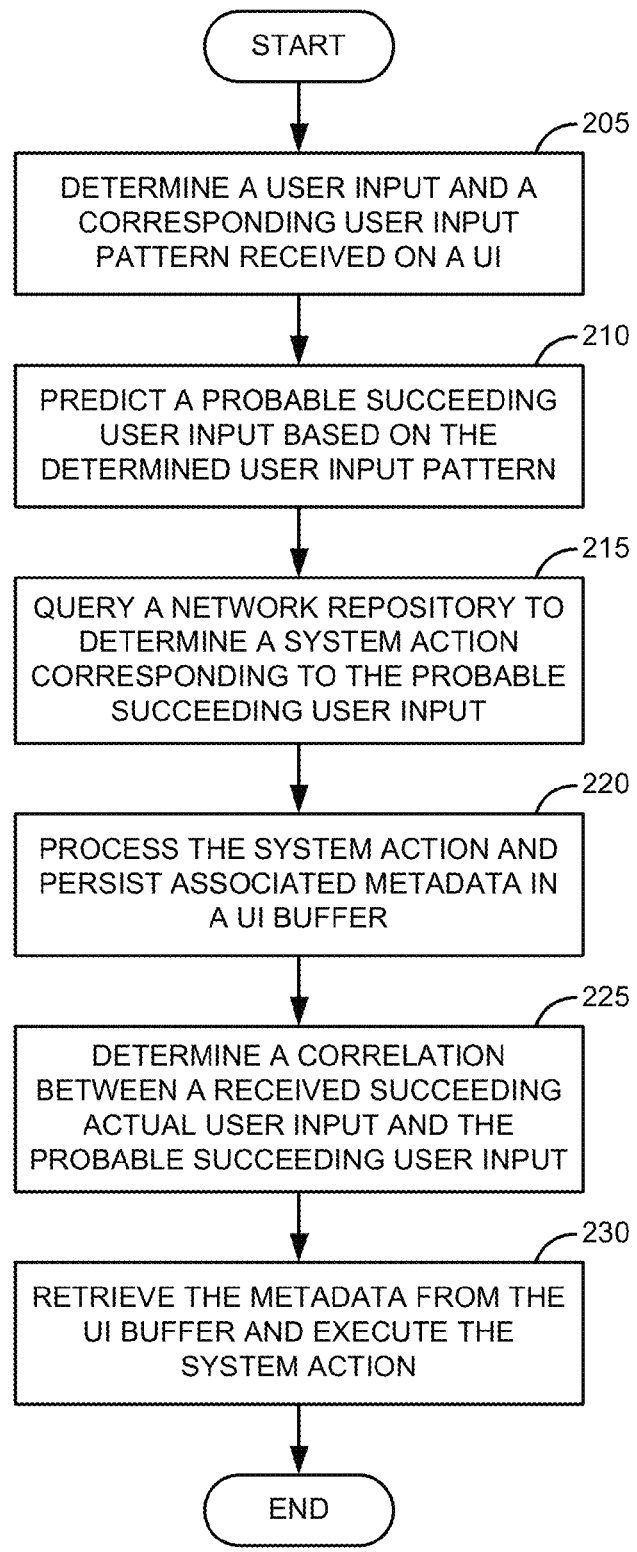
FIG. 2 is a process flow diagram illustrating a method to execute a system action corresponding to a user input, according to an embodiment.

FIG. 2 is a process flow diagram illustrating a method to execute a system action corresponding to a user input, according to an embodiment. In process block 205, a user input and a corresponding user input pattern received on a user interface (UI) is determined. In an embodiment, the UI is associated with a UI controller that generates a UI control grid representing a structural illustration of the UI. The UI control grid includes grid elements that represent UI elements that exist on the UI. In process block 210, based upon the user input pattern, a probable succeeding user input is predicted. In an embodiment, the user input pattern includes structural criteria, and based upon the structural criteria, an associated processor statistically predicts the probable succeeding user input. Statistically predicting the probable succeeding user input further includes determining available succeeding UI elements succeeding from a UI element that received the user input and processing the user input pattern and the available succeeding UI elements to predict the probable succeeding user input.

In process block 215, a network repository is queried to determine a system action corresponding to the probable succeeding user input. A network repository may be a backend system associated with a server, and is accessible via network. The network repository stores system action and associated metadata for the system action to be processed and/or executed. The network repository may further include a mapping between the UI element that receives the user input and the system action to identify a system action for a received user input. In process block 220, the system action is processed and the associated metadata is retrieved and stored in a UI buffer. A UI buffer may be a local storage space that is in communication with a UI controller that manages and maintains the UI. In process block 225, a succeeding user input is received, and a correlation between the received succeeding user input and the predicted probable succeeding user input is determined. Based upon the correlation, in process block 230, the corresponding metadata is retrieved from the UI buffer and the corresponding system action is executed.

FIG. 3 is a block diagram illustrating an exemplary method to execute a system action corresponding to a user input, according to an embodiment. A user input to the plurality of UI elements (e.g. 305, 305A, 310A to 310E) may be received on UI 300. A corresponding UI controller determines a user input pattern by identifying a location and position of a keyboard cursor. For instance if a user is entering information of his/her housing accommodation by typing the relevant details in UI section 305, the UI controller determines the location and position of the cursor (current user input) 305A. Based upon a completion, when the cursor is moved to 310A to acknowledge and accept, the UI controller identifies the user input pattern and predicts a probable user inputs on one of the UI elements (e.g. 310B or 310C or 310D or 310E). In an embodiment, the UI controller may be configured to exclude elements like 'cancel' or 'go to previous page' since such UI elements may not result in accessing the network server for carrying out a system action. Based upon the identified user input pattern, the network repository is queried to retrieve one or more system actions (e.g. REVIEW or SUBMIT) and corresponding metadata. The system actions and corresponding metadata is stored in the UI buffer. Upon receiving the user input on one of the UI elements (e.g. 310B or 310C or 310D or 310E), the UI controller determines a correlation between the actual user input received and the predicted probable user input. For instance, if an actual user input was received for SUBMIT 310D, the UI controller determines a correlation between the predicted 'REVIEW' or 'SUBMIT' and the actual 'SUBMIT'. Based upon an equivalence determined, the UI controller retrieves the system actions and the corresponding metadata from a local buffer (UI buffer) and executes the system action.

In an embodiment, the UI controller includes a UI control grid that represents a structural illustration of UI 300. The UI control grid includes grid elements representing the UI elements 305, 305A, 310A to 310E. The user input pattern at each grid element is determined to identify the preceding user inputs. The identified user input at each UI element may be translated into a grid element understandable correlation. Based upon the user input pattern, a probable succeeding user input is predicted. Each grid element is mapped to a corresponding section of UI 300, and the user input pattern at the corresponding section of UI 300 is identified and notified to the grid element by the UI controller.

Figure 4:
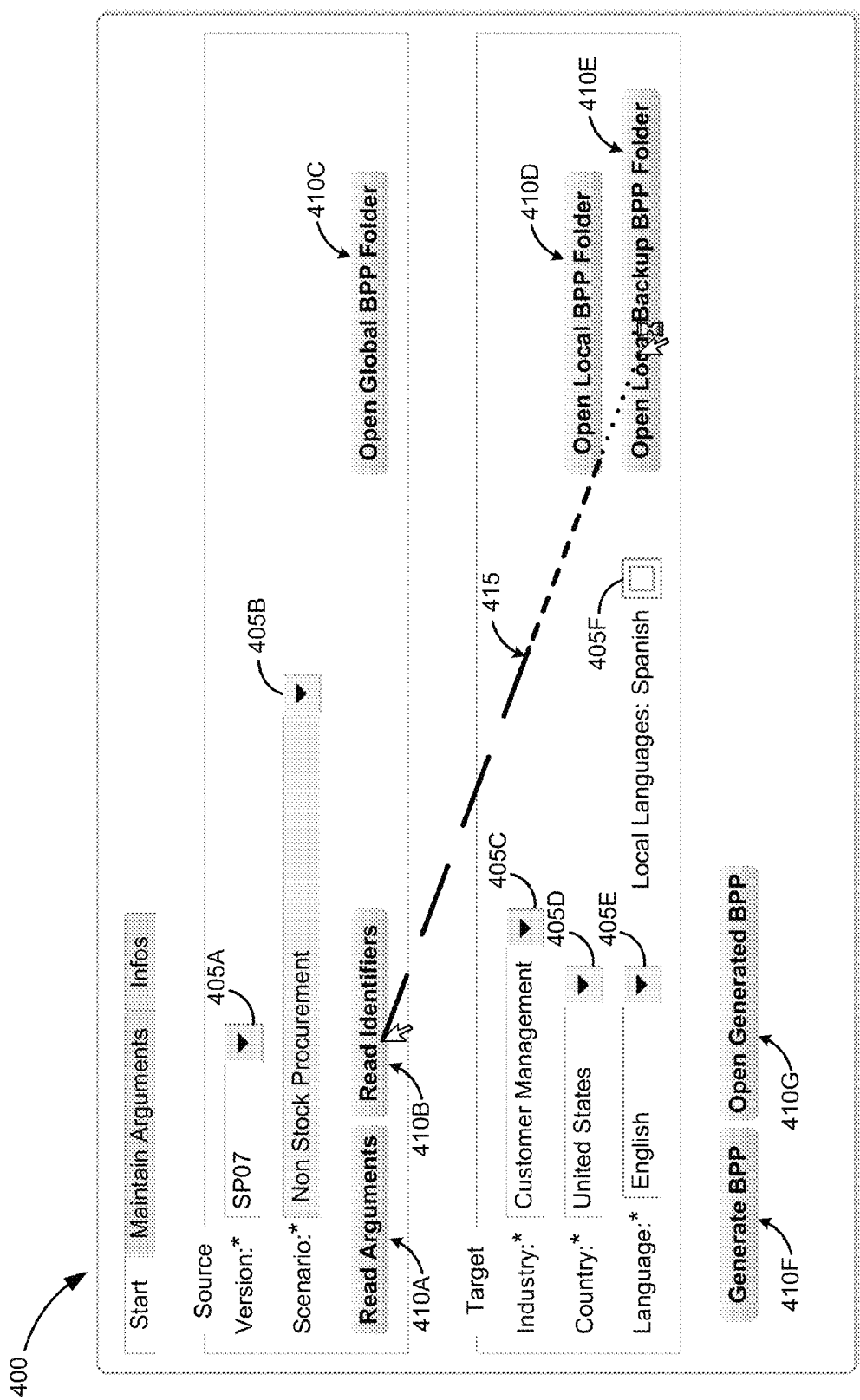
FIG. 4 is a block diagram illustrating an exemplary method to execute a system action corresponding to a user input, according to an embodiment.

FIG. 4 is a block diagram illustrating an exemplary method to execute a system action corresponding to a user input, according to an embodiment. A user input to the plurality of UI elements (e.g. 405A to 405F, 410A to 410G) may be received on UI 400. A corresponding UI controller determines a user input pattern by identifying a location and position of a keyboard cursor. For instance if a user is moving a mouse pointer and clicking to select an option from a drop-down list of options at UI element 405B, the UI controller determines the location and position of the mouse pointer and the mouse click. When the mouse pointer is moved towards 410B to READ IDENTIFIERS, the UI controller identifies the user input pattern and predicts a probable mouse click at 410B. Based upon the identified user input pattern, the network repository is queried to retrieve one or more system actions (e.g. READ IDENTIFIER) and corresponding metadata. The system actions and corresponding metadata is stored in the UI buffer. Upon receiving the mouse click on 410B, the UI controller determines a correlation between the actual user input received and the predicted probable user input. Based upon an equivalence between the actual user input received and the predicted probable user input, the UI controller retrieves the system actions and the corresponding metadata from a local buffer (UI buffer) and executes the system action.

In an embodiment, the UI controller may also determine a movement pattern, for example a speed of movement of the mouse pointer on UI 400. For instance, if a user input is to be received at UI element 410E in UI 400, and a current location of the mouse pointer is at UI element 410B, the mouse has to be moved across the current page. The speed of movement of the mouse pointer varies as the pointer gets closer to its destination (UI element that receives user input). For example, if the current position of the mouse pointer is far from the UI element that accepts user input, a user may briskly drag the mouse pointer until the pointer reaches close to UI element 410E. The movement pattern of the pointer, as illustrated by 415, slows down here, to click UI element 410E that further executes a corresponding action. The UI controller determines the user input pattern which is the movement pattern of the mouse pointer from UI element 410B to UI element 410E, and predicts a probable succeeding user input, which is a mouse-click on UI element 410E. Based upon the pattern, the UI controller queries a network repository and determines the corresponding system action along with the metadata and stores this information in the UI buffer. Upon receiving the mouse click on UI element 410E, the UI controller determines if the user input was received on the predicted probable UI element, and retrieves the information from the UI buffer for execution.

In an embodiment, the UI controller includes a UI control grid that represents a structural illustration of UI 400. The UI control grid includes grid elements representing the UI elements 405A to 405F, 410A to 410G. The user input pattern at each grid element is determined to identify the preceding user inputs. The identified user input at each UI element may be translated into a grid element understandable correlation. Based upon the user input pattern, a probable succeeding user input is predicted. Each grid element is mapped to a corresponding section of UI 400, and the user input pattern at the corresponding section of UI 400 is identified and notified to the grid element by the UI controller.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
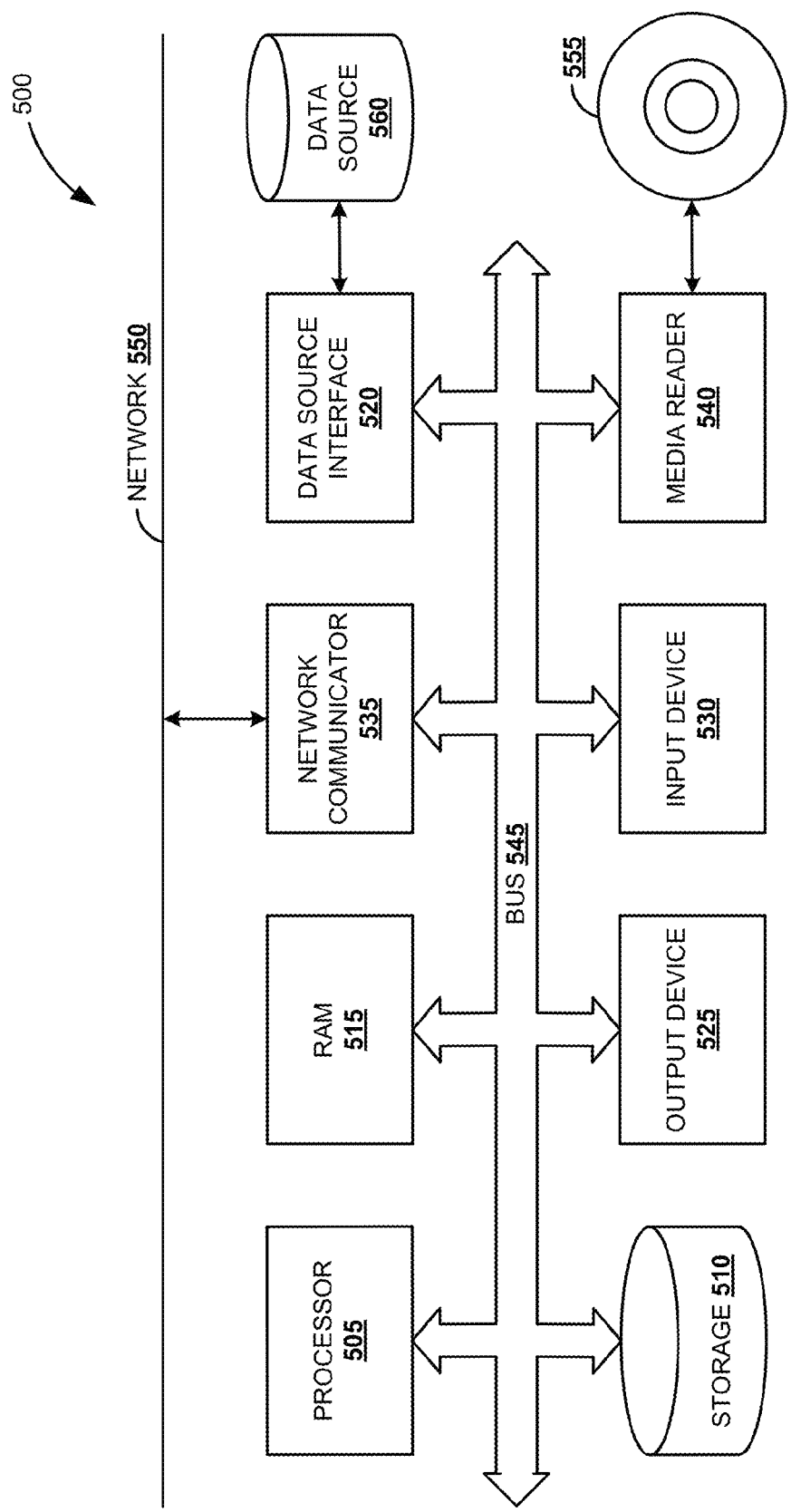
FIG. 5 is a block diagram illustrating a system, according to an embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, continuation servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to execute a system action corresponding to a user input, comprising:
    determining the user input and a corresponding user input pattern received on a computer generated user interface (UI);
    based upon the user input pattern corresponding to the user input, a processor of the computer predicting a probable succeeding user input by determining one or more available succeeding UI elements succeeding from the UI element that received the user input and by processing the user input pattern and the available succeeding UI elements;
    querying a network repository to determine the system action corresponding to the probable succeeding user input;
    processing the system action corresponding to the probable succeeding user input to persist metadata associated with the system action corresponding to the probable succeeding user input in a UI buffer associated with the computer generated UI; and
    determining a correlation between an actual succeeding user input received on the computer generated UI and the predicted probable succeeding user input, to retrieve the metadata of the corresponding system action from the UI buffer for execution.

2. The computer implemented method of claim 1, wherein determining the user input pattern includes determining structural criteria of the user input including one or more occurrences of recurring events associated with the business process to be executed, and based upon the structural criteria, the processor of the computer statistically predicting the probable succeeding user input.

3. The computer implemented method of claim 2, wherein statistically interpreting the probable succeeding user input includes:
   determining one or more available succeeding UI elements succeeding from a UI element that received the user input; and
   processing the user input pattern and the available succeeding UI elements to interpret the probable succeeding user input.

4. The computer implemented method of claim 1, wherein predicting a probable succeeding user input includes: predicting one or more navigational inputs prior to an occurrence of the succeeding user input.

5. The computer implemented method of claim 1 further including: receiving the user input at one or more UI elements associated with the computer generated UI.

6. The computer implemented method of claim 1, wherein predicting the probable succeeding user input comprise:
   generating a UI control grid representing a structural illustration of the computer generated UI, wherein the UI control grid includes one or more grid elements, and each grid element representing a correlation with one or more UI elements corresponding to the computer generated UI; and
   identifying a corresponding preceding user input by identifying the user input pattern each grid element, to interpret a probable succeeding user input.

7. The computer implemented method of claim 6, wherein identifying the user input pattern each grid element includes: identifying the user input at each UI element, and translating the user input to a grid element understandable correlation.

8. The computer implemented method of claim 6, further including: mapping each grid element to a corresponding section of the computer generated UI, to identify the user input pattern at the corresponding section and notify the grid element.

9. The computer implemented method of claim 1, wherein retrieving the metadata of the corresponding system action includes: instantaneously executing the system action based upon the metadata, to condense a network latency of an associated communication network.

10. The computer implemented method of claim 1, wherein persisting the metadata of the system action includes: prefetching a system action corresponding to a probable succeeding navigational input and preloading the UI buffer with the prefetched system action.

11. The computer implemented method of claim 1, wherein determining the correlation includes:
   determining a succeeding user input to a succeeding UI element on the computer generated UI;
   based upon the succeeding user input to the succeeding UI element, determining whether the succeeding user input is identical to the predicted probable succeeding user input;
   retrieving the metadata of the system action corresponding to the predicted probable succeeding user input; and
   executing the system action in view of the succeeding user input.

12. The computer implemented method of claim 1, wherein determining the user input pattern includes determining a current location and a current position of the user input.

13. The computer implemented method of claim 1, wherein determining the user input pattern includes determining a movement of the user input.

14. The computer implemented method of claim 1, wherein predicting a probable succeeding user input further includes:
   recording a movement of the user input; and
   based upon the movement of the user input, triggering a UI controller to predict the probable succeeding user input.

15. An article of manufacture including a computer readable storage medium to tangibly store instructions, which when executed by a computer, cause the computer to:
   determine the user input and a corresponding user input pattern received on a computer generated user interface (UI);
   predict a probable succeeding user input based upon the user input pattern corresponding to the user input, by determining one or more available succeeding UI elements succeeding from the UI element that received the user input and processing the user input pattern and the available succeeding UI elements;
   query a network repository to determine the system action corresponding to the probable succeeding user input;
   process the system action corresponding to the probable succeeding user input to persist metadata associated with the system action corresponding to the probable succeeding user input in a UI buffer associated with the computer generated UI; and
   determine a correlation between an actual succeeding user input received on the computer generated UI and the predicted probable succeeding user input, to retrieve the metadata of the corresponding system action from the UI buffer for execution.

16. A computing system to execute a system action corresponding to a user input, comprising:
   a processor to read and execute instructions stored in one or more memory elements; and
   the one or more memory elements storing instructions related to:
      a computer generated user interface to receive the user input and determine a corresponding user input pattern;
      a UI controller
         to predict a probable succeeding user input, by determining one or more available succeeding UI elements succeeding from the UI element that received the user input, and processing the user input pattern and the available succeeding UI elements;
         to query a network repository to determine the system action corresponding to the probable succeeding user input,
         to process the system action corresponding to the probable succeeding user input and persist metadata associated with the system action corresponding to the probable succeeding user input in a UI buffer, and
         to determine a correlation between an actual succeeding use input received on the computer generated UI and the predicted probable succeeding user input to retrieve the metadata of the corresponding system action from the UI buffer for execution.

17. The computing system of claim 16, wherein the UI controller generates a UI control grid representing a structural illustration of the computer generated UI.

18. The computing system of claim 16, wherein the UI controller determines structural criteria of the user input to statistically interpret a probable succeeding user input.

19. The computing system of claim 16, wherein the UI controller determines one or more available succeeding UI elements succeeding from a UI element that received the user input and processing the user input pattern and the available succeeding UI elements to interpret the probable succeeding user input.

20. The computing system of claim 16, wherein the UI controller predicts one or more navigational inputs prior to an occurrence of the succeeding user input.

* * * * *